United States Patent [19]
Merle

[11] Patent Number: 4,892,403
[45] Date of Patent: Jan. 9, 1990

[54] COMPOSITE PLASTIC LENS AND METHOD OF MAKING THE SAME

[75] Inventor: Joseph Merle, Miami, Fla.

[73] Assignee: Opticast International Corporation, London, England

[21] Appl. No.: 234,090

[22] Filed: Aug. 19, 1988

[51] Int. Cl.$^4$ .............................. G02C 7/02; G02C 7/06
[52] U.S. Cl. ............................................ 351/168; 156/99;
156/153; 156/629; 351/159; 351/166; 351/169;
351/172; 351/176; 351/177
[58] Field of Search ................ 351/159, 166, 168, 172,
351/177, 169, 170, 171, 176; 156/99, 153, 629

[56] References Cited

U.S. PATENT DOCUMENTS

| | | | |
|---|---|---|---|
| 3,588,216 | 6/1971 | Bloom | 351/49 |
| 3,620,888 | 11/1971 | Buzzell | 351/49 |
| 3,711,417 | 1/1973 | Schuler | 351/159 |
| 3,877,798 | 4/1974 | Tolar et al. | 351/168 |
| 3,940,304 | 2/1976 | Schuler | 156/245 |
| 4,070,105 | 1/1978 | Marzouk | 351/159 |
| 4,547,049 | 10/1985 | Cotie | 351/159 |
| 4,645,317 | 2/1987 | Frieder et al. | 351/164 |
| 4,679,918 | 8/1987 | Ace | 351/163 |
| 4,690,512 | 9/1987 | Forsyth | 350/417 |

Primary Examiner—Scott J. Sugarman
Attorney, Agent, or Firm—Robert C. Kain, Jr.

[57] ABSTRACT

The composite plastic lens includes an anterior plastic lens having a first corrective feature and a posterior plastic lens having a second corrective feature. The anterior and posterior lenses are joined together by an adhesive that bonds opposing, etched surfaces of those lenses. The method of making the composite plastic lens includes, in one embodiment, the steps of etching the front and rear surfaces of the posterior and anterior lenses and bonding those etched surfaces together with an adhesive. Another method of making the composite plastic lens includes heating the lenses prior to bonding them together for a time such that the posterior and anterior lenses return to their original shape and curvature.

18 Claims, 2 Drawing Sheets

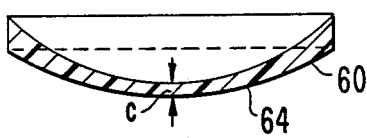
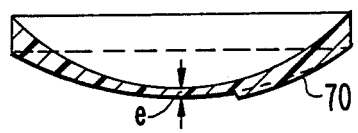
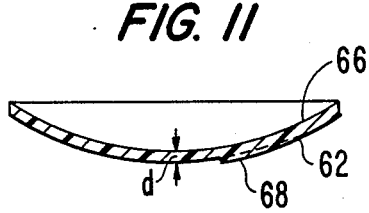
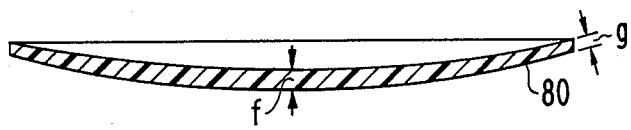
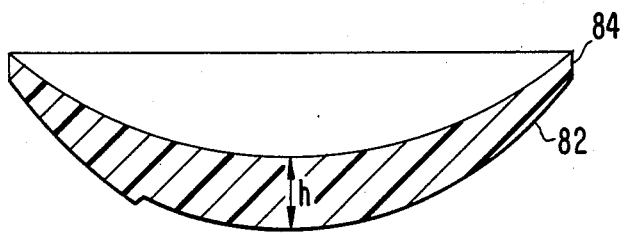
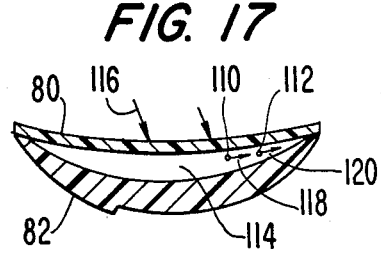
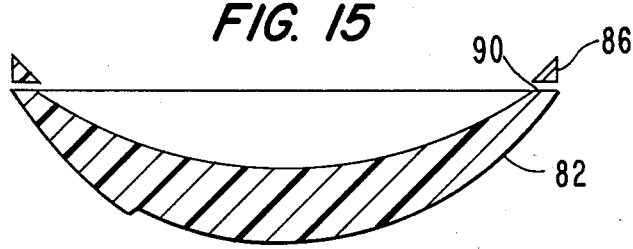
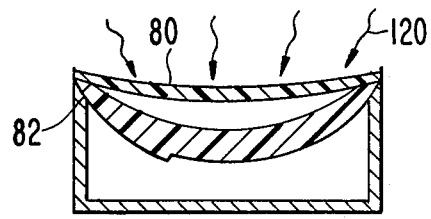
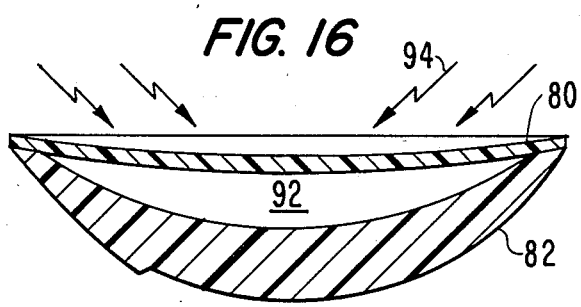
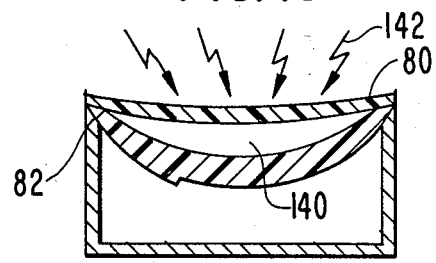

COMPOSITE PLASTIC LENS AND METHOD OF MAKING THE SAME

BACKGROUND OF THE INVENTION

The present invention relates to a composite plastic lens and a method for making the lens.

It is known in the eyeglass industry that plastic lenses can be molded in shapes to provide prescription lenses. These prescription lenses incorporate a corrective feature that alters light rays passing through the lenses. As used herein, the term "corrective feature" refers to an aspect of the lens that corrects for eyesight deficiencies.

Optical clinics have been established which maintain a large quantity of plastic lenses having certain corrective features. Sometimes the lenses have to be ground and polished to match a prescription of a patient. At other times, the clinic maintains a large stock of prescription lenses such that the lenses are simply cut or edged and mounted in an eyeglass frame for the patient. The stock lenses may include bifocal, multifocal or progressive vision lenses. A sizable percentage of the patients can use this type of stock lenses without any grinding and polishing. However, another sizable percentage of the population requires lenses that correct for far vision, near vision and astigmatism. Astigmatism is corrected by using a cylinder lens that is rotated about its optical axis to correct for the patient's astigmatism. The degree of the astigmatism varies from patient to patient and the lens must be carefully positioned in the frame to correct for the astigmatism. Therefore, it is not practical for the optical clinic to maintain stock lenses for typical corrective vision problems as well as for the great variations of a astigmatism combined with multifocal lenses. Accordingly, it is customary in this industry to grind multifocal corrective lenses for astigmatic patients.

U.S Pat. No. 4,645,317 to Frieder, et al., discloses eyeglass lens modules and methods for making those modules. This patent discloses the use of plastic, corrective single vision stock lenses on which is glued a veneer overlay having a plus diopter bifocal or trifocal corrections. The veneer overlay must have a posterior curvature similar to the anterior curvature of the single vision stock lens which make the lens too thick. The veneer overlay is laminated or glued to the stock lens. However, Frieder, et al., do not disclose the use of two plastic lenses that cannot be used individually as corrective lenses because such lenses are too thin, do not disclose etching opposing surfaces of anterior and posterior plastic lenses, and do not disclose the use of heat to cause the lenses to return to their original shape after a deforming force is applied to the lenses. U.S. Pat. No. 4,690,512 to Forsyth discloses a composite lens assembly for two plastic lenses. Glue or optical cement is placed between the lenses in a gap of uniform width. Forsyth discloses the use of a primer comprising an aliphatic polyurethane. Forsyth states in the patent "While no explanation can be furnished for the superior results obtained by the use of the described priming layer on the surface 14 of the plastic lens element 10 as described, it is assumed that the lacquer applied to the surface of the plastic lens influences the molecular structure in such a manner that a firm and stable bond with the silicone adhesive used is established which as experience has shown does not occur in the absence of the primer". At column 3, lines 58-66. Forsyth does not disclose etching opposing services of the plastic lens nor using an adhesive or glue that has the same index of refraction as the posterior and anterior plastic lenses. U.S. Pat. No. 3,877,798 to Tolar, et al., discloses a laminated multifocal lens. One of the lens is a bifocal or a multifocal lens and the other lens is a lens to correct for astigmatism. The lenses are glued together by an optical adhesive. Tolar, et al., do not disclose the step of etching surfaces of anterior and posterior lenses nor the use an adhesive that has an index of refraction equal to the index of refraction of the lenses. Tolar, et al., also do not disclose the use of heat to return the lenses to their original shape after the potentially deforming action of spreading the glue between the lenses. U.S. Pat. No. 3,711,417 to Schuler discloses plastic laminated lenses. However, these lenses are not etched prior to bonding together.

U.S. Pat. Nos. 3,620,888 to Buzzell; U.S. Pat. No. 3,588,216 to Bloom; U.S. Pat. No. 3,940,304 to Schuler; and, U.S. Pat. No. 4,679,918 to Ace disclose various composite lenses without disclosing etching of the lenses or heating of the lenses.

OBJECTS OF THE INVENTION

It is an object of the present invention to provide a composite plastic prescription lens made of two thin lenses each having a corrective feature.

It is another object of the present invention to provide a composite plastic lens that is not capable of being delaminated.

It is a further object of the present invention to provide a composite plastic lens that is made of etched anterior and posterior lenses that are bonded together.

It is a further object of the present invention to provide a composite plastic lens made of two lenses that are heated prior to bonding to return those lenses to their original shapes thereby eliminating optical waves and distortion in the composite lens.

It is a further object of the present invention to provide a method of manufacturing the composite plastic lens.

SUMMARY OF THE INVENTION

The composite plastic lens includes an anterior plastic lens having a first corrective feature and a posterior plastic lens having a second corrective feature. The anterior and posterior lenses are joined together by an adhesive that bonds opposing, etched surfaces of those lenses. The method of making the composite plastic lens includes, in one embodiment, the steps of etching the front and rear surfaces of the posterior and anterior lenses and bonding those etched surfaces together with an adhesive. Another method of making the composite plastic lens includes heating the lenses prior to bonding them together for a time such that the posterior and anterior lenses return to their original shape and curvature.

BRIEF DESCRIPTION OF THE DRAWINGS

Further objects and advantages of the present invention can be found in the detailed description of the preferred embodiments when taken in conjunction with the accompanying drawings in which:

FIG. 10 illustrates a cross-sectional view of posterior, negative power lens having an astigmatic corrective feature;

FIG. 11 illustrates an anterior lens;

FIG. 12 illustrates a negative power, anterior lens;

FIG. 13, illustrates a positive power, posterior lens;

FIG. 14 illustrates a positive power, anterior lens;

FIG. 15 illustrates a manufacturing step for the anterior lens shown in FIG. 14;

FIG. 16 illustrates the bonding of the anterior and posterior lenses shown in FIGS. 13 and 15 with the use of ultraviolet light;

FIG. 17 illustrates the use of force to remove bubbles in the adhesive between the lenses;

FIG. 18 illustrates the manufacturing step of using heat to cause the lenses to return to their original shape and curvature; and, FIG. 19 illustrates the use of ultraviolet light after the heating step shown in FIG. 18.

DETAILED DESCRIPTION OF THE PREFERRED EMBODIMENTS

The present invention relates to a composite plastic lens and the method of making that lens.

Figure 1:
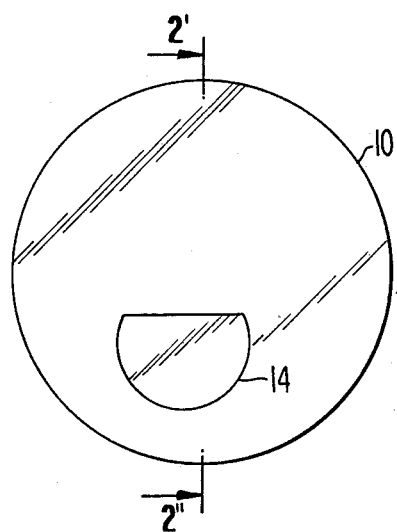
FIG. 1 illustrates a front view of an anterior plastic lens.
Figure 3:
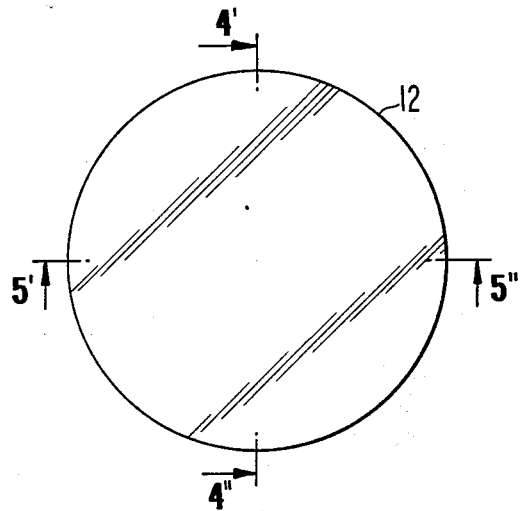
FIG. 3 illustrates a front view of the posterior plastic lens.

FIGS. 1 and 3 respectively show anterior lens 10 and posterior lens 12. Anterior lens 10 is shown having a bifocal, trifocal or multifocal region 14. Anterior lens 10 could also be progressive vision lens.

Figure 2:
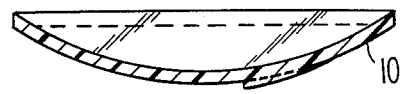
FIG. 2 illustrates a cross-sectional view of that lens from the perspective of section line 2'—2" in FIG. 1.
Figure 4:
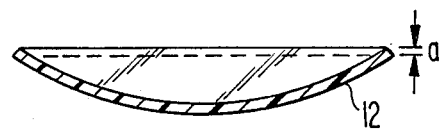
FIG. 4 illustrates a cross-sectional view of the posterior lens from the perspective of section line 4'—4" in FIG. 3.
Figure 5:
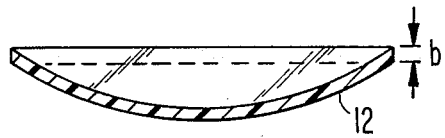
FIG. 5 illustrates another cross-sectional view of the posterior lens from the perspective of section line 5'—5" in FIG. 3.
Figure 7:
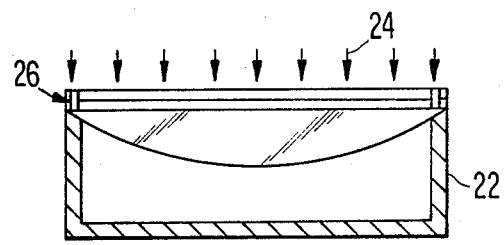
FIG. 7 illustrates another manufacturing step during the bonding of those lenses.

FIGS. 2 and 4, respectively, show cross-sectional views of those lenses from the perspective of section line 2'—2" and 4'—4". With respect to posterior lens 12, that lens has an astigmatic corrective feature. Hence, it is a cylinder lens and distance a on the edge is greater than distance b on the edge shown in FIGS. 4 and 5. FIG. 5 shows a cross-section of that same lens from the perspective of section line 5'—5" in FIG. 3.

Figure 6:
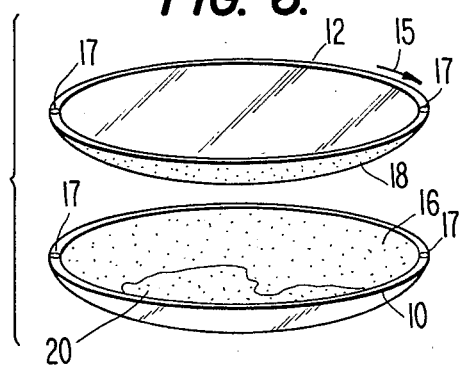
FIG. 6 illustrates a manufacturing step which includes the rotation of the posterior lens with respect to the anterior lens. The figure also illustrates the etched or unpolished surfaces of those lenses.

FIG. 6 shows some of the manufacturing processes for the composite lens. Initially, the anterior and posterior lens are placed together and the posterior lens 12 is rotated about its optical axis, for example, in the direction shown by arrow 15 such that the correct prescription is obtained for the composite lens. The rotation is necessary to obtain a prescription astigmatic composite lens. Thereafter, indexing holes, such as holes 17, are drilled in the edge regions of both the anterior and posterior lens. Preferably, 3 indexing holes are drilled about the periphery of these lenses.

The rear surface 16 of anterior lens 10 and the front surface 18 of posterior lens 12 are etched. As used herein, the term "etched" refers to a process that removes the polish from rear surface 16 and front surface 18. This etching of the surface can be done by chemicals or by a mechanical means such as the use of emery paper. Thereafter, an adhesive or optical glue 20 is placed in the bowl of anterior lens 10.

In one embodiment, the lenses are then placed on a support such as block 22 and a force shown by arrows 24 is applied to the composite lens, designated as composite lens 26, to spread the glue evenly and remove the bubbles from the glue. During bonding, the composite lens is free standing, that is, supported only on the periphery to reduce stress on the lenses and provide a composite lens with no optical defects.

Figure 9:
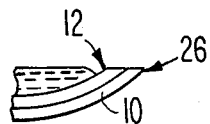
FIG. 9 illustrates a partial cross-sectional view of an edge of the lenses being bonded from the perspective of section lines 9'—9" in FIG. 8.
Figure 8:
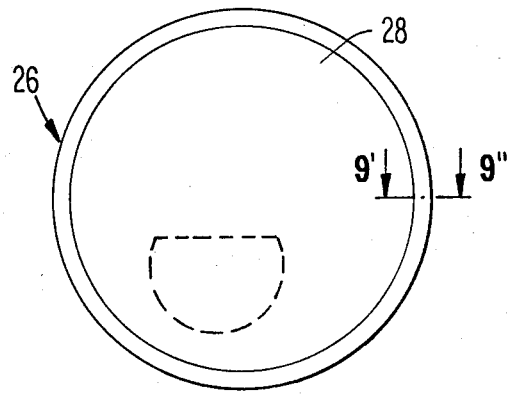
FIG. 8 illustrates a front view of the lenses with a balloon of mercury on the lenses or water which applies pressure to the posterior lens.

FIG. 8 shows one method of applying an even force on the composite lens 26. This method utilizes a mercury balloon in central region 28 that covers substantially all of posterior lens 12. This is shown by viewing the cross-section in FIG. 9. Alternatively, the balloon may be filled with water instead of mercury. In any event, the liquid evenly disburses throughout the central region 28 of composite lens 26 and an even distribution of force is applied at least in concentric circles about the optical axis of both of the lens.

The glue should have an index of refraction equal to the index of refraction of the anterior and posterior lenses when the glue reaches maximum polymerization. Experiments have shown that composite plastic lenses that are glued together, without using the manufacturing step of etching, can be delaminated by a radially inwardly directed force. However, when opposing surfaces of the anterior and posterior lenses are etched, the glue fills the microscopic scratches in the surface and bonds the two lenses together to such a degree that a person cannot delaminate the composite lens structure by the application of a radially directed force.

Use of a uniformly distributed force evenly spreads the glue between the two lenses.

After the bonding step, the composite lens can be "edged" as known by persons of ordinary skill in the art such that the composite lens fits within the eyeglass frames selected by the patient. The composite lens can also have its outer peripheral edge grooved such that a wire can be placed in the groove to hold the lens in frames that are commonly called nylor frames.

FIG. 10 illustrates negative power posterior lens 60. In addition to being a negative power, lens 60 is also a cylindrical lens which corrects for astigmatism. FIG. 11 is an anterior lens 62. One of the problems involved in laminating plastic lenses is that the central thickness of the composite negative lens should not exceed 2 millimeters. For example, if lenses 60 and 62 were bonded together, the thickness at the optical center would generally be the sum of distance c and distance d in FIGS. 10 and 11. Persons of ordinary skill in the art know that lenses can be molded with a 1 millimeter center thickness, that is distance c equals 1 millimeter. Therefore, distance c plus distance d could easily equal 2 millimeters which is acceptable for eyeglasses. Since the power of the negative lens depends upon the increasingly greater thickness of the lens at points towards the edge of the lens away from the optical axis, this 2 millimeter thickness limitation does not present a problem. The anterior or the posterior lens cannot usually be used independently as a corrective lens since they are too thin and flex too much. To combine lenses 60 and 62, lens 60 must be placed atop lens 62 and rotated to achieve the correct astigmatic correction by viewing the two lenses through a lensometer. Further, the front surface of posterior lens 60 must be etched and the rear surface of anterior lens 60 should be etched. Also, the curvature of front surface 64 is similar to the curvature of rear surface 66. Therefore, the surfaces are complementary in nature. Lens 62 could not be a stock lens that only includes a bifocal, trifocal or progressive lens characteristic in region 68 because of the thickness problem.

FIG. 12 illustrates a cross-sectional view of an anterior lens 70. Lens 70 is a negative power lens that could be combined with lens 60 in FIG. 10. The distance e can be approximately 1 millimeter.

Lenses having a positive power present a different problem since positive lenses are thick at the optical center and thin at the edge. FIG. 13 shows posterior lens 80 and FIG. 14 shows anterior lens 82. Lens 80 is a positive lens since the thickness at the center f is greater than the thickness at the edge g. Lens 82 is a very powerful positive lens that, when combined with lens 80 provides a magnification of greater than +2.0. Hence, the sum of distances h and f determines the power of the lens along with the thickness at the edge of the lenses. However, the powerful lens 82 cannot be laminated to lens 80 because of curvature of peripheral edge region 84. Edge region 84 would cause lens 80 to be too thick. Therefore, FIG. 15 shows a manufacturing step wherein a peripheral edge segment 86 is cut or removed from the body of lens 82. The removal of edge section 86 results in a flattened periphery 90 of lens 82. The flattened periphery 90 will match the front curve of the posterior lens 80. Posterior lens 80 can then be placed atop lens 82 as shown in FIG. 16. An optical adhesive is placed intermediate the two lenses in space 92. One type of optical adhesive is cured by light, shown by arrows 94. This light may be in the ultraviolet wave length band. The UV light cures the adhesive placed in interspace 92. Other types of glue or adhesive can be used that polymerize with heat or other environmental conditions.

A problem sometimes arises with the use of the optical adhesive. Particularly, bubbles 110 and 112, in FIG. 17, may be trapped in adhesive 114. To eliminate these bubbles, a force, generally shown by arrow 116, is applied to anterior lens 82 and posterior lens 80. The bubbles can be moved in the direction shown by arrows 118, 120 and forced out of the adhesive.

Because the lenses are so thin, and particularly when bubbles are forced out of the adhesive, the shape of the thin lenses may be distorted, that is, the curvature of the lenses may be different than their original curvature resulting in a wavy composite lens configuration. Particularly when a thin lens, on the order of 1 millimeter in thickness or less, is pressed, the curvature of the lens will change into a wave and that wave may be retained by the lens during the manufacturing process. If that wave remains in the lens after the bonding of the composite lens, the wave causes an optical wave to form in the finished product. Therefore, by looking through different sections of the lens, the image projected by the lens may be distorted.

It has been discovered that when these thin lenses are heated to a certain temperature, their original shape returns. That is, the waves are removed by the application of heat. FIG. 18 shows lens 80 and lens 82 receiving heat that is shown by wavy arrows 120. The thin, plastic lenses have a memory that can be invoked by the application of heat. An adequate temperature has been shown to be 65° C. for a period of about 5 minutes.

FIG. 19 shows that after the application of heat lenses 82 and 80 and glue 140 are subjected to UV light shown by items 142. This cures the glue causes it to reach complete polymerization.

As stated earlier, the adhesive at its maximum polymerization has an index of refraction equal to the index of refraction of the anterior and posterior lenses.

The claims appended hereto are meant to cover these and other changes within the scope and spirit of the present invention.

What is claimed is:

1. A lens for an eyeglass comprising:
   an anterior plastic lens having a first corrective feature;
   a posterior plastic lens having a second corrective feature;
   said anterior and posterior lenses joined together by an adhesive that bonds opposing, etched surfaces of said anterior and posterior lenses; and
   wherein said lenses, when joined, form a prescription lens incorporating said first and second corrective features.

2. A lens as claimed in claim 1 wherein second corrective feature is feature that corrects for astigmatism.

3. A lens as claimed in claim 1 wherein said first corrective feature includes a bifocal, multifocal or a progressive vision corrective feature.

4. A lens as claimed in claim 3 wherein second corrective feature is feature that corrects for astiqmatism.

5. A lens as claimed in claim 1 wherein said adhesive has an index of refraction substantially equal to the index of refraction of said anterior and posterior lenses.

6. A lens as claimed in claim 1 wherein each lens is too thin to be used separately as an eyeglass lens.

7. A method of making a composite plastic lens comprising the steps of:
   providing anterior and posterior plastic lenses each having a corrective feature;
   etching respective front and rear surface of said posterior and anterior lenses;
   bonding the etched surfaces of said lenses together with an adhesive to form a composite lens having a prescriptive characteristic that is a combination of said corrective features.

8. A method as claimed in claim 7 wherein said adhesive has the same index of refraction as said anterior and posterior lenses.

9. A method as claimed in claim 7 wherein said posterior lens corrects for astigmatism and the method includes the step of rotating said posterior lens about its optical axis to obtain said prescriptive characteristic before the step of bonding.

10. A method as claimed in claim 8 including the step of irradiating said adhesive with ultraviolet light during the step of bonding.

11. A method as claimed in claim 7 including the step of flattening the edge of said anterior lens such that it substantially conforms to the shape of an outer peripheral surface of said posterior lens prior to the step of bonding.

12. A method as claimed in claim 7 including the step of applying pressure to said anterior and posterior lens before the step of bonding.

13. A method as claimed in claim 12 wherein there is no pressure applied to the lenses during the step of bonding.

14. A method of making a composite plastic lens comprising the steps of:
providing anterior and posterior lenses each having a corrective feature;
etching respective front and rear surfaces of said posterior and anterior lenses;
providing an adhesive complementary to said lenses;
placing said adhesive between said front and rear etched surfaces;
raising the temperature of said lenses and said adhesive prior to the time said adhesive sets sufficient to cause said lenses to attain their original shape and curvature; and thereafter,
bonding said lenses together with said adhesive to form a composite lens having a prescriptive characteristic that is a combination of said corrective features.

15. A method as claimed in claim 14 wherein said posterior lens corrects for astigmatism and the method includes the step of rotating said posterior lens with respect to said anterior lens to obtain said prescriptive characteristic before the step of bonding.

16. A method as claimed in claim 14 including the step of removing any bubbles in said adhesive by exerting pressure on the lenses with the adhesive therebetween prior to the step of raising the temperature.

17. A method as claimed in claim 14 including the step of irradiating the lenses with ultraviolet light during the step of bonding.

18. A method as claimed in claim 16 wherein said adhesive has the same index of refraction as said anterior and posterior lenses.

* * * * *